INVENTOR.
WILLIAM S. GALLAWAY
ARTHUR C. SEIBEL
BY
T E Kristofferson
ATTORNEY

March 5, 1968 W. S. GALLAWAY ET AL 3,372,000
FLAME IONIZATION DETECTOR
Filed Feb. 27, 1964 2 Sheets-Sheet 2

INVENTOR.
WILLIAM S. GALLAWAY
ARTHUR C. SEIBEL
BY
T E Kristofferson
ATTORNEY 3,372,000
FLAME IONIZATION DETECTOR
William S. Gallaway, Fullerton, and Arthur C. Seibel, Garden Grove, Calif., assignors to Beckman Instruments, Inc., a corporation of California
Filed Feb. 27, 1964, Ser. No. 347,749
6 Claims. (Cl. 23—254)

ABSTRACT OF THE DISCLOSURE

A detector is disclosed having a nonconducting jet with two parallel plate electrodes placed generally above it, in a nonconducting chamber out of contact with the flame and extending slightly below the tip of the jet and of sufficient length and area to insure substantially complete collection of both positive ions and electrons. The remainder of the parts are also of nonconducting material insofar as possible. An auxiliary ignition jet may be spaced below and to the side of the main jet. A dual burner circuit employing such a detector is illustrated.

---

This invention relates to a flame ionization detector for use, for example, in a gas chromatograph and, more particularly, to an improved detector designed to operate at higher temperatures and to yield more uniform and reproducible results useful in a dual detector configuration.

Hydrogen flame detectors which operate on the basis of ionization are well known in the gas chromatograph art. Such detectors have customarily employed collector electrodes in the shape of rods, rings, or cylinders and have used the jet as one of the electrodes for establishing the field. The jet has customarily thus been metallic in nature and the walls of the cylinder also have been metallic as have other parts of the detector, such as the nut or fastener, holding the jet in position. Several of the prior art devices maintained the flame from the jet in contact with the collector electrodes.

If it is desired to operate a hydrogen flame ionization detector system as a dual detector to obtain base line drift compensation during temperature programming of gas chromatograph columns, it is necessary that the collection characteristics of the electrode system be symmetrical with respect to collection of electrons or positive ions. In prior art detectors, operation at this temperature caused problems due to emission from metallic parts in the detector and other side effects, e.g. loss of signal due to leakage currents in high impedance insulators. Also when operating in the dual detector mode, utilizing burners in a half bridge circuit, prior art devices suffered from dissymmetry and unequal collection of positive ions and electrons.

Accordingly, it is an object of this invention to provide a hydrogen flame detector for gas chromatography capable of substantially completely collecting both positive ions and electrons.

Another object of the invention is to provide such a detector in which the effects of competitive collection of elements in the detector other than the electrodes is minimized.

A further object of the invention is to provide a hydrogen flame detector having a reduced noise level.

A still further object of the invention is to provide such a detector having features adapting it particularly to use in a dual detector mode of operation.

A still further object of the invention is to provide such a detector having a mixing chamber with an effective volume which is reduced due to purging techniques, as well as having a relatively small real volume, in order to reduce peak spreading.

In carrying out the invention, in one form thereof, a detector is provided having a non-conducting jet with two parallel plate electrodes spaced generally above the jet in a chamber out of contact with the flame from the jet. The parallel plates extend slightly below the tip of the jet and are of sufficient length and area to assure substantially complete collection of both positive ions and electrons. The chamber walls are constructed of a ceramic material and the remainder of the parts of the detector are also constructed of nonconducting material insofar as possible in order to reduce competitive collection effects and to reduce emission when operating at high temperatures.

Another feature which may be included is the provision of an auxiliary ignition jet spaced below and to the side of the main jet, removing it from the field between the electrodes, again to provide a more uniform field and to remove the auxiliary jet as a source of competitive collection.

The novel features which are believed to be characteristic of the invention are set forth with particularity in the appended claims. The invention itself, however, together with further objects and advantages thereof, can best be understood by reference to the following description, taken in conjunction with the accompanying drawings, in which:

Figure 1:
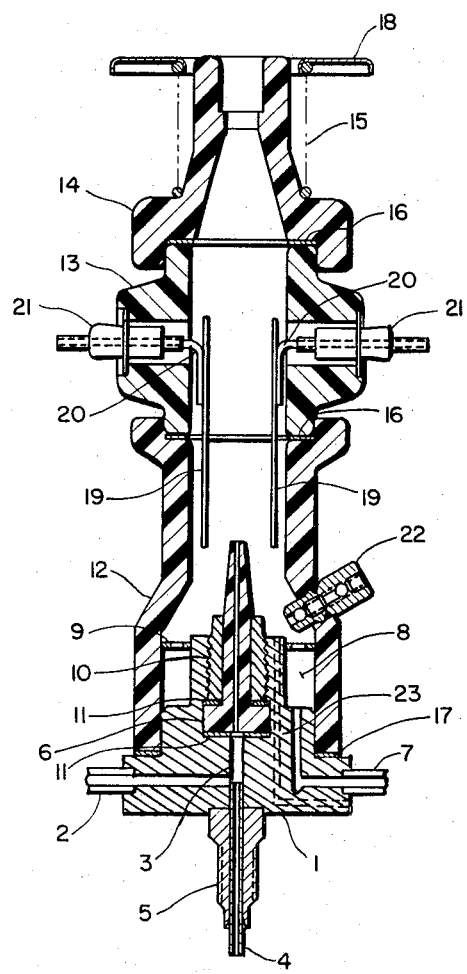
FIG. 1 is a cross section diagram of one embodiment of the invention.

Turning now to the drawings, in FIG. 1 a detector is illustrated having a base 1 which may be made of a corrosion resistant metal such as stainless steel. Base 1 is provided with several tubes for admission of gases as follows. Hydrogen gas is admitted through a tube 2 and is mixed in a small volume mixing chamber 3 with the effluent of the chromatographic column introduced through a tube 4 which is held in place by a fitting 5. The gas is then passed through a jet 6 and is burned in the presence of air admitted through a tube 7 and a chamber 8. The air passes from chamber 8 through diffuser 9 which may be a porous metal plate and which distributes the air evenly around the combustion zone around the tip of jet 6. The jet 6 is made of a material which is a nonconductor of electrical current at elevated temperatures. Sapphire and high purity, high density alumina, for example, are suitable materials.

The jet 6 is mounted in base 1 and sealed against leakage by means of a compression nut 10 and soft metal gaskets 11. Three ceramic sections, a body 12, an electrode support section 13, and a chimney section 14 make up the combustion chamber, and are held in place by means of a spring 15 and sealed together and to the base 1 by means of gaskets 16 and 17, which serve to prevent dust particles from being aspirated into the combustion zone. Spring 15 acts against ring 18 which is connected to base 1 by means of metal straps (not shown). The internal geometry of the chamber is designed to assure the nonturbulent flow of gases through and out of the burner.

A pair of electrodes 19 consist of a pair of parallel plates which may be spaced approximately 1 cm. apart and at an equal distance from the tip of the jet 6. Electrical connection is made to the electrodes 19 by means of wires 20 passing through the insulators 21. Since the electrode system is completely symmetrical, either electrode may act as the polarizing electrode or the collecting electrode, and either positive ions or electrons are collected with equal efficiency.

When necessary to prevent condensation of the column effluent, the base 1 of the detector may be heated. The insulators 21, however, remain relatively cool, and, therefore, nonconducting by virtue of the fact that they are mounted in a poorly heat-conducting ceramic assembly spaced some distance from the source of heat at base 1.

Figure 2:
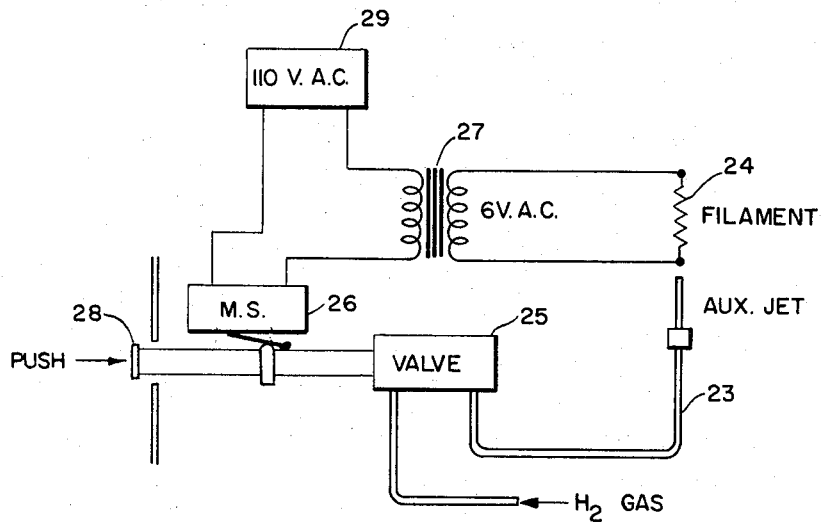
FIG. 2 is a schematic diagram of auxiliary ignition jet circuitry which may be used in the detector of FIG. 1.

The detector may also be provided with a system for igniting the jet 6 which consists of a heated wire filament contained in an insert plug 22 and used to ignite hydrogen emanating from an auxiliary ignition jet 23 spaced below the tip of the jet 6. This auxiliary igniter is better illustrated in FIG. 2 in which the auxiliary jet 23 and hot wire filament 24 are arranged within the detector housing such that a burst of hydrogen issuing from the jet 23 will impinge on the filament thus igniting the hydrogen and consequently the main jet 6. External to the burner a normally closed valve 25, a microswitch 26, and step down transformer 27 are arranged such that when button 28 is pushed the microswitch 26 is closed, heating the filament 24 from a source of A.C. voltage 29. Concurrently, the valve 25 is opened admitting hydrogen gas through the auxiliary jet 23. When the button is released, valve 25 closes and the power to filament 24 is turned off.

Most ignitor systems for hydrogen flame detectors incorporate a heated wire in close proximity to the jet which often interfers with the normal ion collection characteristics of the detector. The system described above eliminates the necessity of disturbing the normal flow of gases through the detector as is necessary in such systems.

Returning to FIG. 1, the small mixing volume of the chamber 3, with the provision for bringing the tail of a capillary column directly into the base of the burner through tube 4, provides an extremely small effective volume, thus assuring the narrowest possible peaks that the column is capable of producing. The use of the parallel plate electrodes 19 in conjunction with the nonconducting jet 6 provides a symmetrical field such that the plateau of the current voltage curve, representative of 100 percent collection efficiency, is reached at the same voltage for a particular column bleed rate in both sample and reference detectors when using a dual detector configuration, even though positive ions are collected with one detector while the electrons are collected with the other. This permits the use of a half bridge circuit such as shown in FIG. 3 rather than a differential input electrometer.

Figure 3:
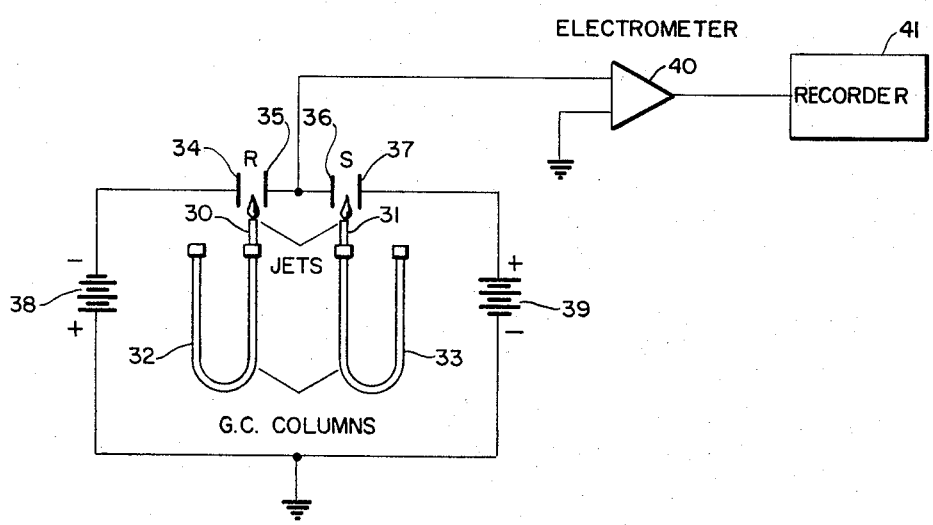
FIG. 3 is a schematic diagram partly in block form showing two such detectors connected in a dual configuration and to an electrometer and recorder.

In FIG. 3 two jets 30 and 31 are connected to columns 32 and 33, respectively. Jet 30 in reference detector R has two electrodes 34 and 35 and jet 31 in sample detector S has two associated electrodes 36 and 37. A source of potential shown as batteries 38 and 39 are connected by connecting the negative electrode of battery 38 to electrode 34, the positive electrode of battery 38 to ground, the negative electrode of battery 39 to ground and the positive electrode of battery 39 to detector electrode 37. Detector electrodes 35 and 36 are then connected together and through an electrometer 40 to the input of a recorder 41. Again this connection illustrates the method of utilizing two burners in a half bridge circuit to provide compensation for column bleed during temperature programing. Because of the complete symmetry of the electrode system, both positive ions and electrons are collected with equal efficiency. An excellent compensation is therefore achieved in the dual mode of operation.

Returning to FIG. 1, the all ceramic combustion chamber formed of sections 12, 13 and 14 eliminates competitive ion collection and consequent nonlinearity of response while additionally providing a long conducting path from the base 1 to the electrode insulators 21 allowing high temperature operation of the burner with reduced noise due to leakage current. By making the jet 6 of the suggested materials, in addition to reducing its effects as a competitive collector and as a source of field nonuniformity, it is also reduced or substantially eliminated as a source of noise due to thermionic emission effects at high temperatures. Some prior art devices have used glass jets which become conductive at about 350° C., whereas the device described is capable of operating in the range around 500° C.

While a particular embodiment of the invention has been illustrated and particular characteristics have been disclosed, it will be understood, of course, it is not intended to limit the invention thereto since many modifications may be made and it is, therefore, contemplated by the appended claims to cover any such modifications as fall within the true spirit and scope of the invention.

What we claim and desire to secure by Letters Patent of the United States is:

1. A flame ionization detector comprising, a nonconducting housing forming a combustion chamber, a nonconducting jet positioned in said chamber for admitting a mixture of combustible and sample gases for combustion into said chamber, means for admitting oxygen into said chamber to support combustion, a pair of substantially parallel plate electrodes positioned in said chamber and extending symmetrically upward from said jet and having sufficient length and area to assure substantially complete collection of both electrons and positive ions formed during said combustion, said electrodes being spaced from said jet so as to keep the flame created by said combustion out of contact therewith.

2. A hydrogen flame ionization detector comprising, a nonconducting housing forming a combustion chamber, a nonconducting jet positioned in said chamber for admitting a mixture of hydrogen and sample gases for combustion into said chamber, means for admitting air into said chamber to support combustion, a pair of substantially parallel plate electrodes positioned in said chamber and extending symmetrically upward from a point just below the tip of said jet and having sufficient length and area to assure substantially complete collection of both electrons and positive ions formed during said combustion, said electrodes being spaced from said jet so as to keep the flame created by said combustion out of contact therewith.

3. A flame ionization detector comprising, a nonconducting housing forming a combustion chamber, a nonconducting jet positioned in said chamber for admitting a mixture of combustible and sample gases for combustion into said chamber, means for admitting a third gas into said chamber to support combustion, a pair of substantially parallel plate electrodes positioned in said chamber and extending symmetrically upward from a point just below the tip of said jet and having sufficient length and area to assure a substantially complete collection of both electrons and positive ions formed during said combustion, said electrodes being spaced from said jet so as to keep the flame created by said combustion out of contact therewith, an auxiliary ignitor jet spaced in said chamber below the tip of said nonconducting jet, means for passing a combustible gas through said auxiliary jet, and means for igniting said gas passed through said auxiliary jet, whereby said auxiliary jet will ignite the gas flowing through said nonconducting jet without interrupting the flow of gases therethrough.

4. A hydrogen flame ionization detector comprising; a nonconducting housing of ceramic material forming a combustion chamber; a nonconducting jet constructed of high purity, high density alumina positioned in said chamber for admitting a mixture of hydrogen and sample gases for combustion into said chamber; means for admitting air into said chamber to support combustion; a pair of substantially parallel plate electrodes positioned in said chamber and extending symmetrically upward from a point just below the tip of said jet and having sufficient length and area to assure substantially complete collection of both electrons and positive ions formed during said combustion; said electrodes being spaced from said jet so as to keep the flame created by said combustion out of contact therewith.

5. A hydrogen flame ionization detector comprising; a nonconducting housing of ceramic material forming a combustion chamber; a nonconducting jet of high purity, high density alumina positioned in said chamber for admitting a mixture of hydrogen and sample gases for combustion in said chamber; means for admitting air into said chamber to support combustion; a pair of substantially parallel plate electrodes positioned in said chamber and extending symmetrically upward from a point just below the tip of said jet and having sufficient length and area to assure substantially complete collection of both electrons and positive ions formed during said combustion; said electrodes being spaced from said jet so as to keep the flame created by said combustion out of contact therewith; an auxiliary ignitor jet spaced in said chamber below the tip of said nonconducting jet; means for admitting hydrogen through said auxiliary jet; and means for igniting said hydrogen passed through said auxiliary jet to in turn ignite the gases passing through said nonconducting jet without interrupting the passage of gases therethrough.

6. A hydrogen flame ionization detector comprising, a nonconducting ceramic housing forming a combustion chamber, a nonconducting jet positioned in said combustion chamber, a mixing chamber for obtaining a mixture of hydrogen and sample gases having a minimum necessary volume to assure the narrowest possible peaks, means for admitting the contents of said mixing chamber through said nonconducting jet for combustion into said combustion chamber, means for admitting air into said combustion chamber to support combustion, and a pair of substantially parallel plate electrodes positioned in said chamber and extending symmetrically upward from a point just below the tip of said jet and having sufficient length and area to assure substantially complete collection of both electrons and positive ions formed during said combustion, said electrodes being spaced from said jet so as to keep the flame created by said combustion out of contact therewith.

References Cited

UNITED STATES PATENTS

| | | | |
|---|---|---|---|
| 3,027,241 | 3/1962 | Andreatch et al. | 23—232 |
| 3,086,848 | 4/1963 | Reinecke | 23—232 |
| 3,175,886 | 3/1965 | Krzeminski et al. | 23—232 |

MORRIS O. WOLK, *Primary Examiner.*

JOSEPH SCOVRONEK, *Examiner.*

R. M. REESE, *Assistant Examiner.*